US012811337B2

(12) United States Patent
Miyamoto

(10) Patent No.: US 12,811,337 B2
(45) Date of Patent: Nov. 24, 2026

(54) CONNECTOR SYSTEM AND METHOD OF ASSEMBLING IT

(71) Applicant: SUMITOMO WIRING SYSTEMS, LTD., Mie (JP)

(72) Inventor: Takeru Miyamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 373 days.

(21) Appl. No.: 18/662,703

(22) Filed: May 13, 2024

(65) Prior Publication Data

US 2024/0396258 A1 Nov. 28, 2024

(30) Foreign Application Priority Data

May 23, 2023 (JP) ................................ 2023-084536

(51) Int. Cl.
*H01R 13/52* (2006.01)
*H01R 13/50* (2006.01)
*H01R 43/26* (2006.01)

(52) U.S. Cl.
CPC ......... *H01R 13/5219* (2013.01); *H01R 13/50* (2013.01); *H01R 43/26* (2013.01)

(58) Field of Classification Search
CPC ..... H01R 13/5219; H01R 13/50; H01R 43/26
See application file for complete search history.

(56) References Cited

U.S. PATENT DOCUMENTS 10,326,233 B2 * 6/2019 Coenegracht ...... H01R 13/5202
10,367,292 B2 * 7/2019 Furuya ............... H01R 13/5202
2001/0041470 A1 * 11/2001 Makita ............... H01R 13/5219 439/271
2007/0059967 A1 * 3/2007 Itou .................... H01R 13/5219 439/345
2016/0036157 A1 * 2/2016 Endo .................. H01R 13/4365 439/587
2019/0348797 A1 * 11/2019 Shiraishi ............ H01R 13/6315
2020/0076139 A1 * 3/2020 Lehnert .............. H01R 13/5219
2021/0066849 A1 * 3/2021 Takagi ................... H01R 13/60

FOREIGN PATENT DOCUMENTS

JP 2002-280131 A 9/2002

* cited by examiner

*Primary Examiner* — Leah Macchiarolo
(74) *Attorney, Agent, or Firm* — Venjuris, P.C.

(57) ABSTRACT

A connector system includes a female terminal, a female housing for accommodating the female terminal, a male terminal to be connected to the female terminal, a male housing for accommodating the male terminal, the male housing entirely surrounding around the female terminal and the male terminal in cooperation with the female housing, and an annular packing to be sandwiched by the female housing and the male housing in a connection direction A of the female terminal and the male terminal. The female housing includes a wall portion extending in the connection direction A of the female terminal and the male terminal outside the male housing. The annular packing includes a rising portion to be sandwiched by the male housing and the wall portion in a direction intersecting the connection direction A.

9 Claims, 6 Drawing Sheets

CONNECTOR SYSTEM AND METHOD OF ASSEMBLING IT

CROSS-REFERENCE TO RELATED APPLICATIONS

This application is based on and claims priority from Japanese Patent Application No. 2023-084536, filed on May 23, 2023, with the Japan Patent Office, the disclosure of which is incorporated herein in its entirety by reference.

TECHNICAL FIELD

The present disclosure relates to a connector system and a method of assembling it.

BACKGROUND

Japanese Patent Laid-open Publication No. 2002-280131 discloses a technique for shield connector for device connection. The shield connector for device connection described in Japanese Patent Laid-open Publication No. 2002-280131 is provided with an inner housing to be mounted inside a shield case, an outer housing to be mounted outside the shield case, a male terminal fixed and supported in the inner housing and a first rubber packing to be sandwiched between the shield case and the outer housing.

SUMMARY

According to the technique described in Japanese Patent Laid-open Publication No. 2002-280131 as described above, since the first rubber packing is sandwiched between the outer housing and the shield case, sealing is provided between the outer housing and the shield case. However, it is desired to further enhance water stop performance for water from laterally outer sides of the outer housing and the shield case.

Accordingly, the present disclosure aims to provide a technique capable of further enhancing water stop performance from a laterally outer side to an inner side of a connected part of a connector system.

This object is solved according to the invention by the features of the independent claims. Particular embodiments of the invention are subject of the dependent claims.

According to one aspect, there is provided a connector system with at least one terminal, a housing for at least partly accommodating the terminal, at least one mating terminal to be connected to the terminal, at least one mating housing for at least partly accommodating the mating terminal, the mating housing entirely surrounding around the terminal and the mating terminal in cooperation with the housing, and at least one annular packing to be sandwiched (i.e. squeezed or compressed) by the housing and the mating housing in a connection direction of the terminal and the mating terminal, the housing including at least one wall portion substantially extending in the connection direction of the terminal and the mating terminal outside the mating housing, and the annular packing including at least one rising portion to be sandwiched (i.e. squeezed or compressed) by the mating housing and the wall portion in a direction intersecting the connection direction.

Specifically, there is provided a connector system being provided with a terminal, a housing for accommodating the terminal, a mating terminal to be connected to the terminal, a mating housing for accommodating the mating terminal, the mating housing entirely surrounding around the terminal and the mating terminal in cooperation with the housing, and an annular packing to be sandwiched by the housing and the mating housing in a connection direction of the terminal and the mating terminal, the housing including a wall portion extending in the connection direction of the terminal and the mating terminal outside the mating housing, and the annular packing including a rising portion to be sandwiched by the mating housing and the wall portion in a direction intersecting the connection direction.

Since the annular packing includes the rising portion to be sandwiched or squeezed or compressed by the housing and the mating housing in the connection direction and sandwiched by the mating housing and the wall portion in the direction intersecting the connection direction, it is possible to suppress fluid or liquid (e.g. water) intrusion from a laterally outer side to an inner side of a connected part of the connector system.

Particularly, the annular packing may include a wall portion tip cover extending from the rising portion to at least partly cover a tip of the wall portion, and preferably a wall portion outer cover further extending from the wall portion tip cover to at least partly cover an outer side surface of the wall portion. In this case, the wall portion is entirely covered. Therefore, the inflow of liquid (e.g. water) to the inside of the connector system through the wall portion is suppressed.

Further particularly, the mating housing may include at least one projection projecting toward the wall portion. In this case, a pressing force can be enhanced between the projection and the wall portion in a part of the annular packing. Thus, a liquid (e.g. water) stop effect is particularly enhanced in the part where the projection is present.

Further particularly, the annular packing may include at least one projecting portion to be sandwiched substantially in the connection direction by the housing and the mating housing, the projecting portion preferably being located on the rising portion side. In this case, the projecting portion is pressed and deformed by the housing and the mating housing, whereby a gap between the housing and the annular packing and a gap between the mating housing and the annular packing are reduced. Particularly, since a gap to the annular packing tends to be formed by a corner part between a horizontal part of the housing and the rising portion of the wall portion, that gap is reduced.

Further particularly, the projecting portion is thickest in a part closest to the rising portion. In this case, by particularly thickening the projecting portion toward the rising portion, the annular packing deformed by being pressed easily enters the corner part between the horizontal part of the housing and the rising portion of the wall portion. In this way, the gap to the annular packing is further reduced by the corner part between the horizontal part of the housing and the rising portion of the wall portion.

Further particularly, the annular packing may include an insertion hole substantially in the form of a long hole, a part of the housing surrounding the terminal being inserted through the insertion hole, and the projecting portions may include a first projecting portion and a second projecting portion located apart from each other in a longitudinal direction of the insertion hole between the rising portion and the insertion hole. In this case, liquid (e.g. water) hardly intrudes between the first and second projecting portions outside the part of the housing surrounding the terminal.

Further particularly, a corner part between a side surface substantially facing the wall portion, out of the mating housing, and a surface for pressing the annular packing toward the housing along the connection direction, out of the mating housing, may substantially have a rounded shape having a radius of curvature R1, a corner part between a surface to be brought into contact with the mating housing in a part to be sandwiched between the housing and the mating housing, out of the annular packing, and a surface to be brought into contact with the mating housing in the rising portion may substantially have a rounded shape having a radius of curvature R2, and the radius of curvature R1 may be smaller than the radius of curvature R2. In this case, the corner part of the annular packing is pressed by the corner part of the mating housing. Since the radius of curvature R1 is smaller than the radius of curvature R2 at this time, the corner part of the annular packing is easily deformed and the gap between the housing and the annular packing and the gap between the mating housing and the annular packing are reduced.

According to another aspect, there is provided a method of assembling a connector system, in particular according to the above aspect or a particular embodiment thereof, comprising: at least partly accommodating at least one terminal in a housing; at least partly accommodating at least one mating terminal to be connected to the terminal into at least one mating housing; and mating the at least one mating housing with the housing thereby; entirely surrounding the mating housing around the terminal and the mating terminal in cooperation with the housing; and sandwiching (i.e. squeezing or compressing) at least one annular packing by the housing and the mating housing in a connection direction of the terminal and the mating terminal, wherein the housing including at least one wall portion substantially extending in the connection direction of the terminal and the mating terminal outside the mating housing, and wherein the annular packing including at least one rising portion to be sandwiched by the mating housing and the wall portion in a direction intersecting the connection direction.

According to a particular embodiment, the method further comprising sandwiching at least one projecting portion of the annular packing substantially in the connection direction by the housing and the mating housing, the projecting portion preferably being located on the rising portion side.

Further particularly, the annular packing includes an insertion hole substantially in the form of a long hole, a part of the housing surrounding the terminal being inserted through the insertion hole, and the projecting portions include a first projecting portion and a second projecting portion located apart from each other in a longitudinal direction of the insertion hole between a rising portion of the annular packing and the insertion hole.

According to the above, it is possible to suppress fluid intrusion, particularly liquid or water intrusion, from a laterally outer side to an inner side of a connected part of a connector system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

EMBODIMENT (1. Configuration of Connector System)

Figure 1:
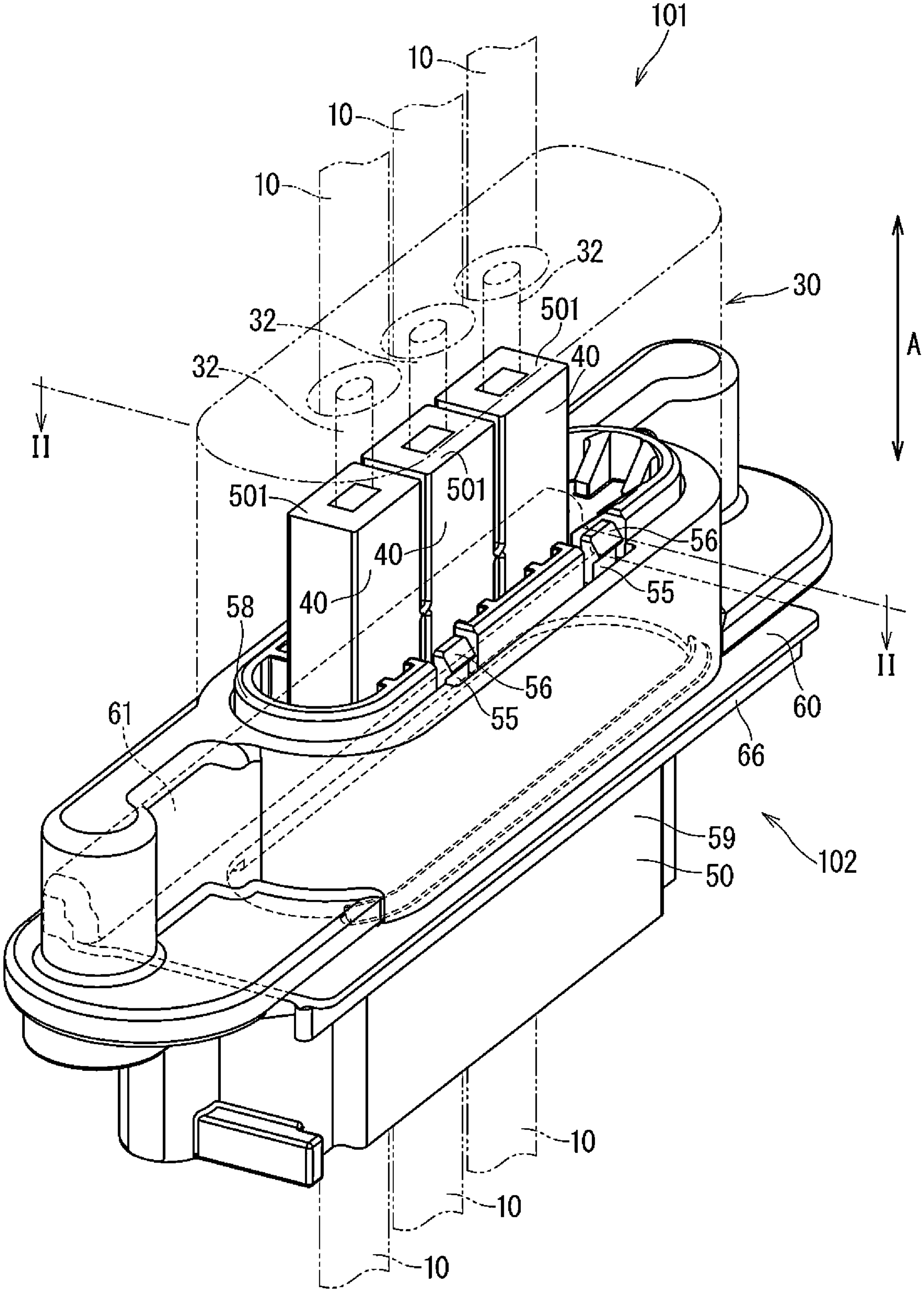
FIG. 1 is a perspective view schematically showing a connector system.
Figure 2:
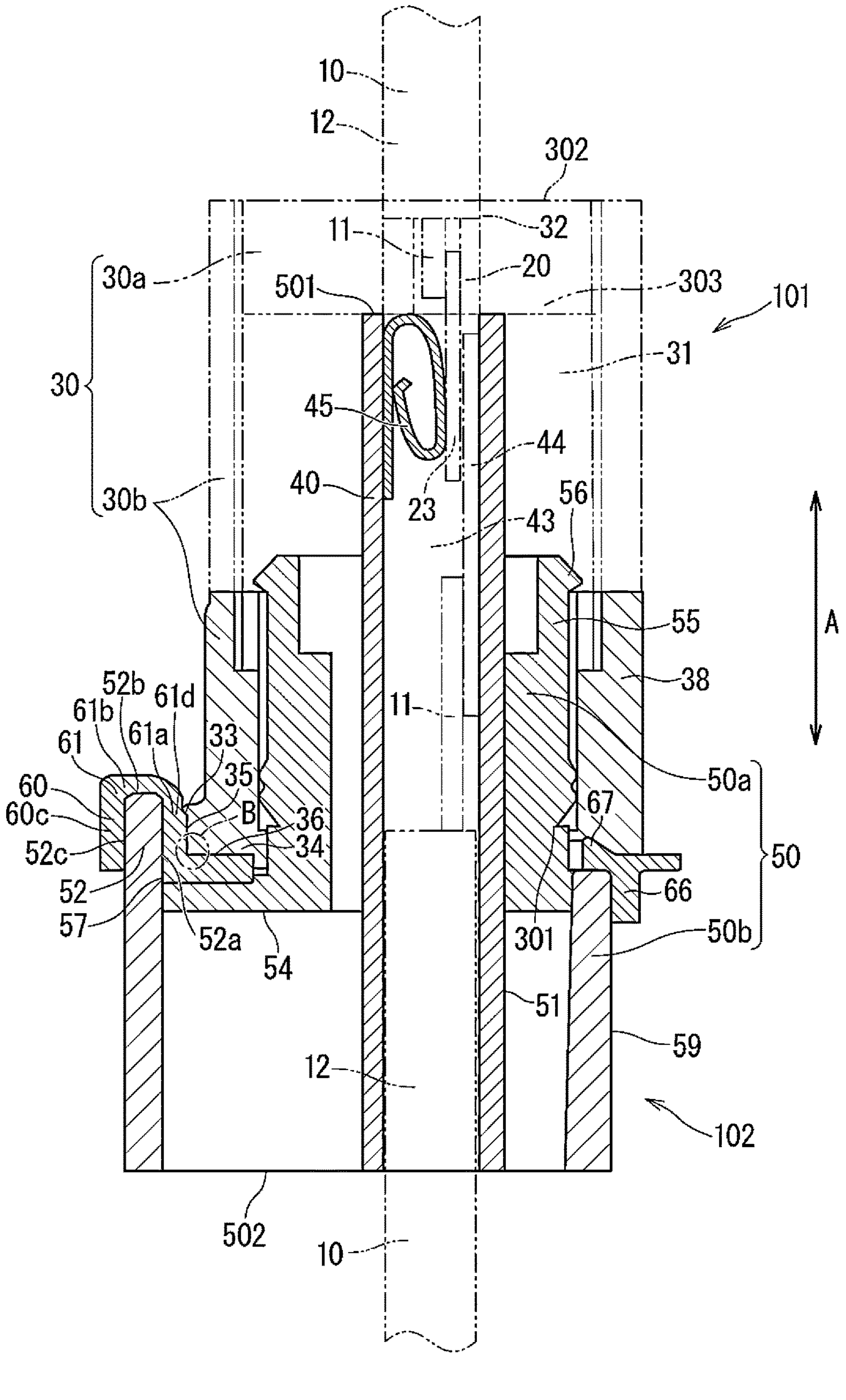
FIG. 2 is a section along II-II of FIG. 1.

The configuration of a connector system 100 according to one embodiment is described with reference to FIGS. 1 and 2. FIG. 1 is a perspective view schematically showing the connector system 100. FIG. 2 is a section along II-II of FIG. 1. Note that a part of a male connector 101 and one or more wires 10 are shown by virtual lines in FIGS. 1 and 2.

The connector system 100 particularly is a system for electrically connecting various devices. The connector system 100 is provided with the at least one male connector 101, a female connector 102 and at least one annular packing 60 respectively located between the male connector 101 and the female connector 102. The connector system 100 is, for example, to be arranged in a vehicle.

(Basic Configuration)

The male connector 101 is provided with one or more terminals (male terminals) 20 provided on (particularly one or more end parts of) the one or more wires 10 and a connector housing (male housing) 30 for at least partly accommodating the one or more male terminals 20.

The female connector 102 is provided with one or more terminals (female terminals) 40 provided on (particularly one or more end parts of) the one or more wires 10 and a connector housing (female housing) 50 for at least partly accommodating the one or more female terminals 40.

The male connector 101 may be referred to as a mating connector, and the female connector 102 may be referred to as a connector. The wire 10 and the terminal 20, 40 provided thereon (particularly the end part thereof) may be called a wire with terminal.

The male housing 30 and the female housing 50 entirely surround around the respective one or more male terminals 20 and the one or more female terminals 40 in cooperation with each other. In this way, the male housing 30 and the female housing 50 can suppress the inflow of fluid (particularly liquid or water) and the like to the male terminal(s) 20 and the female terminal(s) 40 from outside.

Note that, in this embodiment, the annular packing 60 (to be described in detail later) to be sandwiched by the respective male housing 30 and the female housing 50 further suppresses the inflow of fluid (particularly liquid or water)

and the like to the respective male terminal(s) 20 and the female terminal(s) 40 arranged inside the female housing 50 and the male housing(s) 30.

(Mating or Male Housing)

The male housing 30 (as a particular mating housing) is, for example, composed of or comprises an enclosure made of an insulating material such as resin and/or a shell made of a conductive material (particularly metal material) for shielding the enclosure.

The male housing 30 is, for example, provided with a male housing body 30*a* formed by molding and particularly a male housing shell 30*b* at least partly covering the male housing body 30*a* (hereinafter, the male housing body 30*a* and particularly the male housing shell 30*b* are collectively referred to as the male housing 30).

The male housing body 30*a* particularly is the enclosure made of the insulating material such as resin.

Further, the male housing shell 30*b* particularly is the shell made of the conductive material (particularly metal material) for substantially shielding the male housing body 30*a*. The male housing body 30*a* and the male housing shell 30*b* particularly are engaged or engageable with each other by an unillustrated engaging portion.

At least one recess 31 is provided in one end surface (inserted surface) 301 of the male housing 30. Further, the male housing 30 is provided with one or more terminal accommodation chambers (cavities) 32 penetrating from another end surface (back surface) 302 to a back surface 303 of the recess 31. In this embodiment, three terminal accommodation chambers 32 exemplarily are provided.

The male terminal 20 at least partly is to be accommodated into the respective terminal accommodation chamber 32. The male terminal 20 is, for example, at least partly inserted into the terminal accommodation chamber 32 through the back surface 302.

Although not shown, a core connecting portion of the male terminal 20 particularly is fixed or fixable to the terminal accommodation chamber 32 (fixed or fixable, for example, by locking) with the core connecting portion at least partly accommodated in the terminal accommodation chamber 32 and/or a contact point portion 23 extending in the recess 31.

The one or more respective wires 10 substantially extending from the back surface 302 may be bundled by at least one tying element or tool (not shown) e.g. formed by or comprising an adhesive tape and/or a zip tie.

Note that the male housing 30 particularly includes at least one projection 33 substantially projecting toward a wall portion 52 of the female housing 50 to be described later.

(Female Housing)

Figure 3:
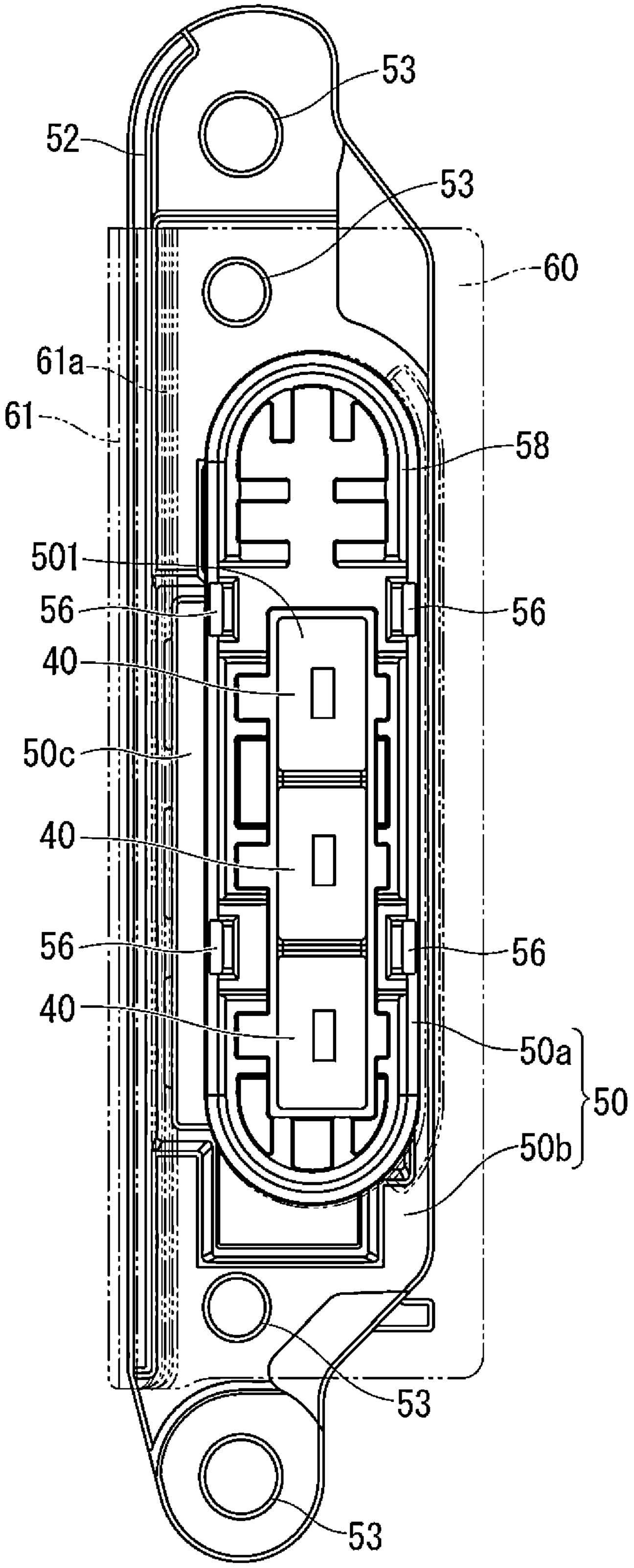
FIG. 3 is a plan view showing a female housing together with female terminals.
Figure 4:
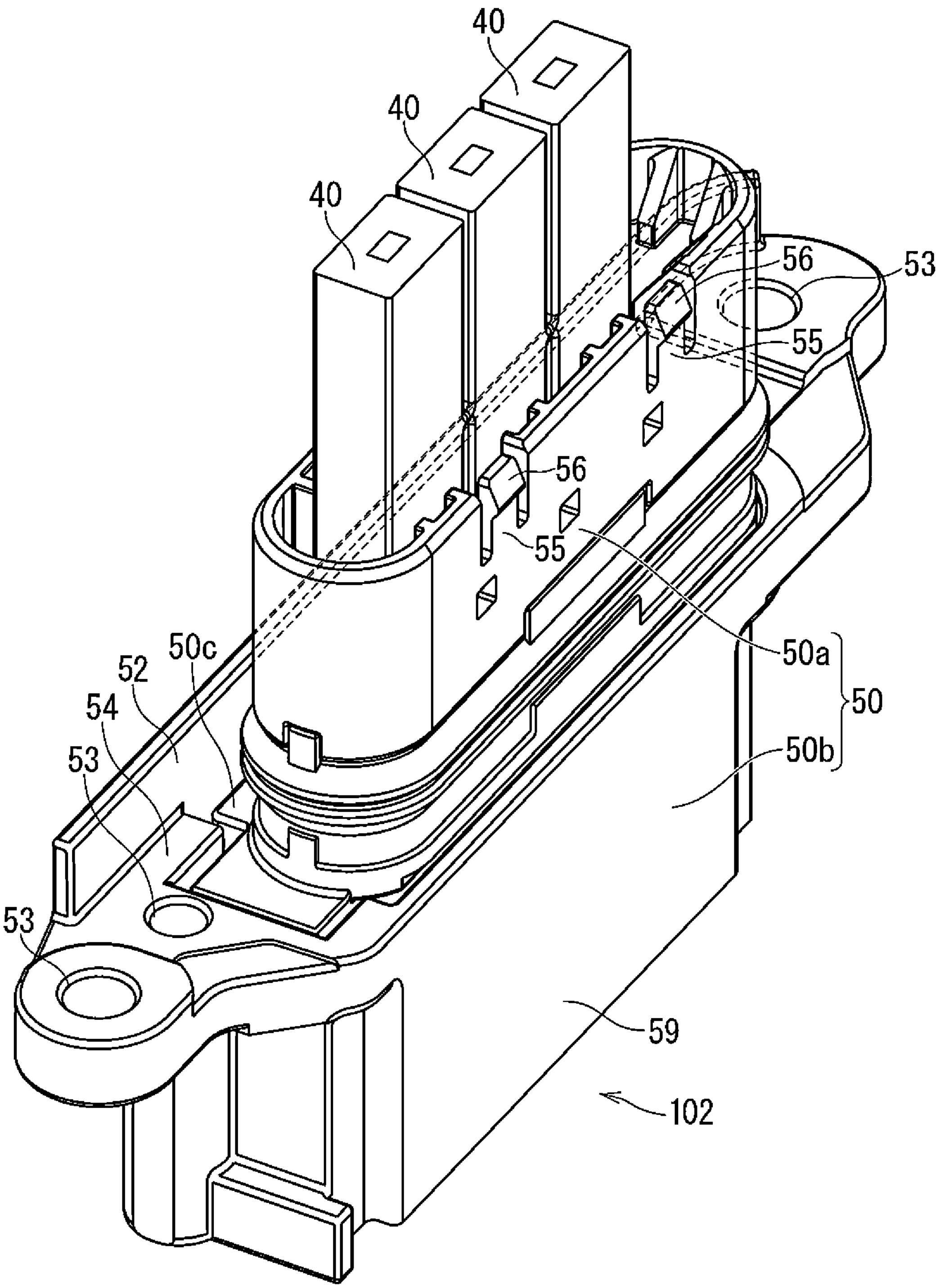
FIG. 4 is a perspective view showing the female housing together with the female terminals.

FIG. 3 is a plan view showing the female housing 50 (as a particular housing mateable with the mating housing) together with the one or more female terminals 40. Further, FIG. 4 is a perspective view showing the female housing 50 together with the one or more female terminals 40. Note that the at least one annular packing 60 is shown by a virtual line (two-dot chain line) in FIG. 3.

Similarly to the male housing 30, the female housing 50 particularly is composed of or comprises an enclosure made of an insulating material such as resin and a shell made of a conductive material (particularly a metal material) for shielding the enclosure.

The female housing 50 is, for example, provided with a female housing body 50*a* formed by molding and/or a female housing shell 50*b* at least partly covering the female housing body 50*a* (hereinafter, the female housing body 50*a* and the female housing shell 50*b* particularly are collectively referred to as the female housing 50).

The female housing body 50*a* and the female housing shell 50*b* are engaged or engageable with each other by an unillustrated engaging portion.

The female housing body 50*a* particularly is the enclosure made of the insulating material such as resin.

Further, the female housing shell 50*b* particularly is the shell made of or comprising the conductive material (particularly the metal material) for shielding the female housing body 50*a*.

The female housing 50 is provided with one or more terminal accommodation chambers (cavities) 51 particularly penetrating from one end surface (inserting surface) 501 to another end surface (back surface) 502. In this embodiment, three terminal accommodation chambers 51 exemplarily are provided.

The female terminal 40 particularly is individually at least partly accommodated into the (particularly each) terminal accommodation chamber 51. The female terminal 40 is, for example, at least partly inserted into the terminal accommodation chamber 51 through the back surface 502 and/or fixed to the terminal accommodation chamber 51 (fixed, for example, by locking) particularly while being entirely accommodated in the terminal accommodation chamber 51.

The respective wire(s) 10 extending from the back surface 502 may be bundled by a tying element or tool (not shown) particularly formed by an adhesive tape and/or a zip tie.

As shown in FIGS. 2 to 4, the female housing 50 is provided with at least one peripheral wall portion 58 at least partly surrounding the one or more female terminals 40.

Specifically, the peripheral wall portion 58 is in the form of a long hole in a plan view (when viewed from a front side of FIG. 3). A longitudinal direction of the long hole shape particularly substantially is a parallel direction of an arrangement direction of the female terminals 40.

An outer peripheral wall portion 38 of the male housing 30 particularly is arranged or arrangeable substantially around the peripheral wall portion 58.

The outer peripheral wall portion 38 of the male housing 30 particularly substantially is in the form of a long hole in a plan view (when viewed from the front side of FIG. 3).

Note that the inner periphery of the outer peripheral wall portion 38 of the male housing 30 particularly substantially is shaped along or in conformity the outer periphery of the peripheral wall portion 58 of the female housing 50.

In a plan view (when viewed from the front side of FIG. 3), the inner periphery of the outer peripheral wall portion 38 of the male housing 30 substantially has, for example, a shape similar to the outer periphery of the peripheral wall portion 58 of the female housing 50.

In this embodiment, the outer peripheral wall portion 38 substantially is to be fit to the peripheral wall portion 58.

Further, the female housing 50 includes the at least one wall portion 52 particularly substantially extending in a connection direction A of the one or more respective male terminals 20 and the one or more female terminals 40 particularly outside the outer peripheral wall portion 38 of the male housing 30.

The wall portion 52 particularly stands or projects to substantially suppress liquid or water splash to connected parts of the male terminal(s) 20 and the female terminal(s) 40 in a plan view. In this embodiment, the wall portion 52 particularly stands on a part to the left of the connected parts of the male terminal(s) 20 and the female terminal(s) 40 in FIG. 3. That is, the wall portion 52 particularly is provided at a position partially surrounding the plurality of female terminals 40.

More specifically, the wall portion 52 is provided at a position surrounding the one or more, particularly the plurality of female terminals 40 from one side orthogonal to the parallel or extension direction of the female terminals 40.

Specifically, the wall portion 52 substantially extends in parallel to the extension direction of the female terminal(s) 40.

Note that, if the connector system 100 is arranged in a vehicle, a left side in FIG. 3 (side where the wall portion 52 is located) particularly is a side in proximity to the outside of the vehicle. In other words, the side where the wall portion 52 is located particularly is a side in proximity or oriented towards a side where an entrance or presence of liquid is to be expected. The wall portion 52 stands on the side in proximity to the outside of the vehicle. Thus, the inflow of liquid or water from the outside of the vehicle to the connected parts of the male terminal(s) 20 and the female terminal(s) 40 particularly can be substantially suppressed by the at least one annular packing 60 (to be described in detail later) particularly including at least one rising portion 61*a* to be sandwiched or squeezed or engaged by the male housing 30 and the wall portion 52.

Further, the annular packing 60 particularly is to be sandwiched or squeezed or engaged between the wall portion 52 and the male housing 30. Thus, the inflow of liquid (e.g. water) between the wall portion 52 and the male housing 30 particularly is further suppressed.

Further, in this embodiment, the male housing 30 includes the at least one projection 33 projecting toward the wall portion 52 as described above. The projection 33 particularly substantially extends along a longitudinal direction of the wall portion 52.

A pressing force particularly can be enhanced between the at least one projection 33 and the wall portion 52 in a part of the annular packing 60 by such projection(s) 33. Thus, a liquid or water stop effect is particularly enhanced in the part sandwiched between the projection 33 and the wall portion 52 in the annular packing 60.

(Coupling of Male Housing and Female Housing)

As shown in FIGS. 1 and 2, the female housing 50 particularly is formed with one or more extending portions 55 substantially extending in the connection direction A. In this embodiment, e.g. four extending portions 55 are formed. The extending portion 55 particularly is resiliently deformable in a direction intersecting the connection direction A.

At least one projection 56 substantially projecting outward particularly is formed on or near the tip of the (particularly each) extending portion 55. The extending portion 55 is, for example, made of resin and/or resiliently deformably formed.

When the female housing 50 is coupled to the at least one male housing 30, the one or more projections 56 at least partly enter the male housing 30 by the resilient deformation of the extending portion(s) 55. One or more engaging portions (not shown) substantially shaped to fit or engage the projections 56 are, for example, formed inside the male housing 30. If the one or more projections 56 reach the one or more respective engaging portions in the male housing 30, the projection(s) 56 is/are engaged with the engaging portion(s).

Further, the female housing 50 particularly is formed with one or more, particularly a plurality of screw insertion holes 53. The male housing 30 is also formed with one or more, particularly a plurality of screw insertion holes (not shown) at positions substantially corresponding to the respective screw insertion hole(s) 53 of the female housing 50 at the time of engagement with the female housing 50.

With the female housing 50 and the male housing 30 particularly engaged by the projection(s) 56 and the engaging portion(s) (not shown) as described above, one or more screws are inserted into the one or more screw insertion holes 53 of the female housing 50 and the one or more screw insertion holes (not shown) of the male housing 30 and tightened. In this way, the male housing 30 and the female housing 50 particularly are coupled.

Note that, specifically at this time, the annular packing 60 is arranged between the male housing 30 and the female housing 50 and sandwiched or squeezed or engaged between the male housing 30 and the female housing 50.

(Wire)

The wire 10 is, for example, an insulated wire and includes a core wire 11 and an insulation coating 12 surrounding the core wire 11.

The core wire 11 is an electrically conductive member (conductor) and/or made of various electrically conductive materials (e.g. copper, copper alloy, aluminum, aluminum alloy and the like).

The insulation coating 12 is an electrically non-conductive and flexible coating and/or made of various synthetic resin materials (e.g. polyvinyl chloride (PVC), polypropylene (PP), polyethylene (PE), cross-linked polyethylene (XLPE) and the like).

(Terminals)

The core connecting portion (not shown) is provided on (particularly one end side or base end side) of the male terminal 20. Similarly, a core connecting portion (not shown) is provided on (particularly one end side or base end side) of the female terminal 40.

The core wire 11 particularly extends over a certain length from an end part of the insulation coating 12 (i.e. a state where the insulation coating 12 around the core wire 11 is stripped over the certain length to expose the core wire 11), and the core connecting portion is to be mechanically and electrically connected to this extending core wire 11.

Connection between the core connecting portion and the core wire 11 is to be realized by an appropriate method (e.g. crimping, ultrasonic welding, resistance welding, soldering or the like).

In this embodiment, a plurality of e.g. three female terminals 40 substantially are arranged in parallel on a straight line.

Further, the male terminals 20 particularly at least partly are to be inserted and connected to the (e.g. three) juxtaposed female terminals 40.

The contact point portion 23 to be electrically connected to the mating terminal is provided on the other end side (tip side) of the male terminal 20.

In this embodiment, the contact point portion 23 of the male terminal 20 particularly substantially is in the form of an elongated plate. However, the contact point portion 23 may be, for example, in the form of a rod, a tab, a pin or the like without limitation to this shape.

The female terminal 40 particularly includes a tubular portion 43, a contact piece 44 at least partly located inside the tubular portion 43 and/or a spring piece 45 having a spring structure formed at least partly inside the tubular portion 43.

The contact piece 44 of the female terminal 40 and the wire (core wire 11) to be connected to the female terminal 40 are electrically connected by an appropriate method (e.g. crimping, ultrasonic welding, resistance welding, soldering or the like). The contact piece 44 and the core wire 11 may be electrically connected particularly via a braided wire (not shown).

The male terminal 20 particularly is to be inserted at least partly into the tubular portion 43. In this embodiment, the tubular portion 43 particularly substantially is formed into a rectangular or polygonal column shape.

Specifically, a bottom surface, an upper surface and one or more, particularly a pair of side surfaces at least partly are provided inside the tubular portion 43. The contact point portion 23 of the male terminal 20 particularly substantially is inserted along the bottom surface of the tubular portion 43.

Specifically, the contact point portion 23 substantially is biased in a direction toward the contact piece 44 by the spring piece 45 of the female terminal 40.

At the time of connecting the male terminal 20 and the female terminal 40, the contact point portion 23 of the male terminal 20 and the contact piece 44 of the female terminal 40 particularly come into contact.

(Annular Packing)

Figure 5:
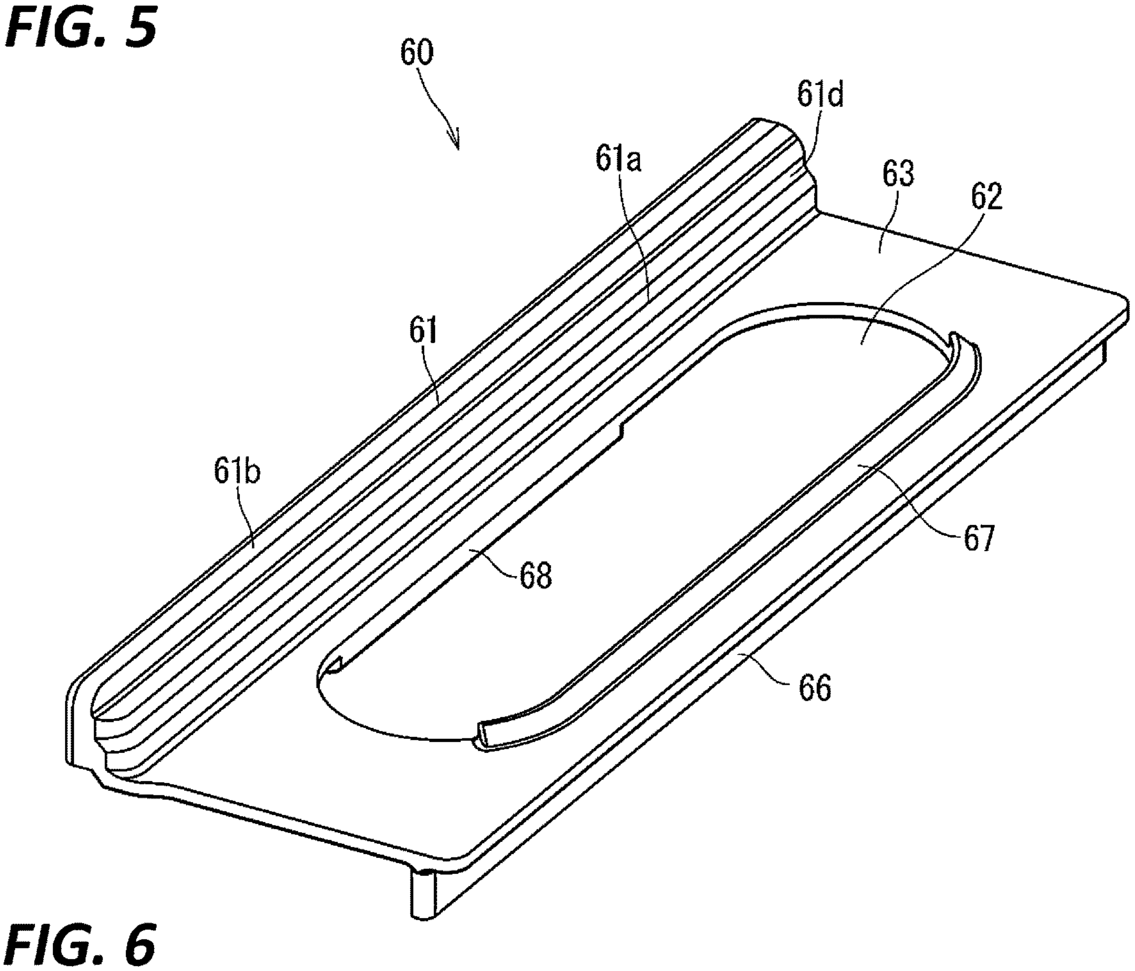
FIG. 5 is a perspective view showing an annular packing from a front surface side.
Figure 6:
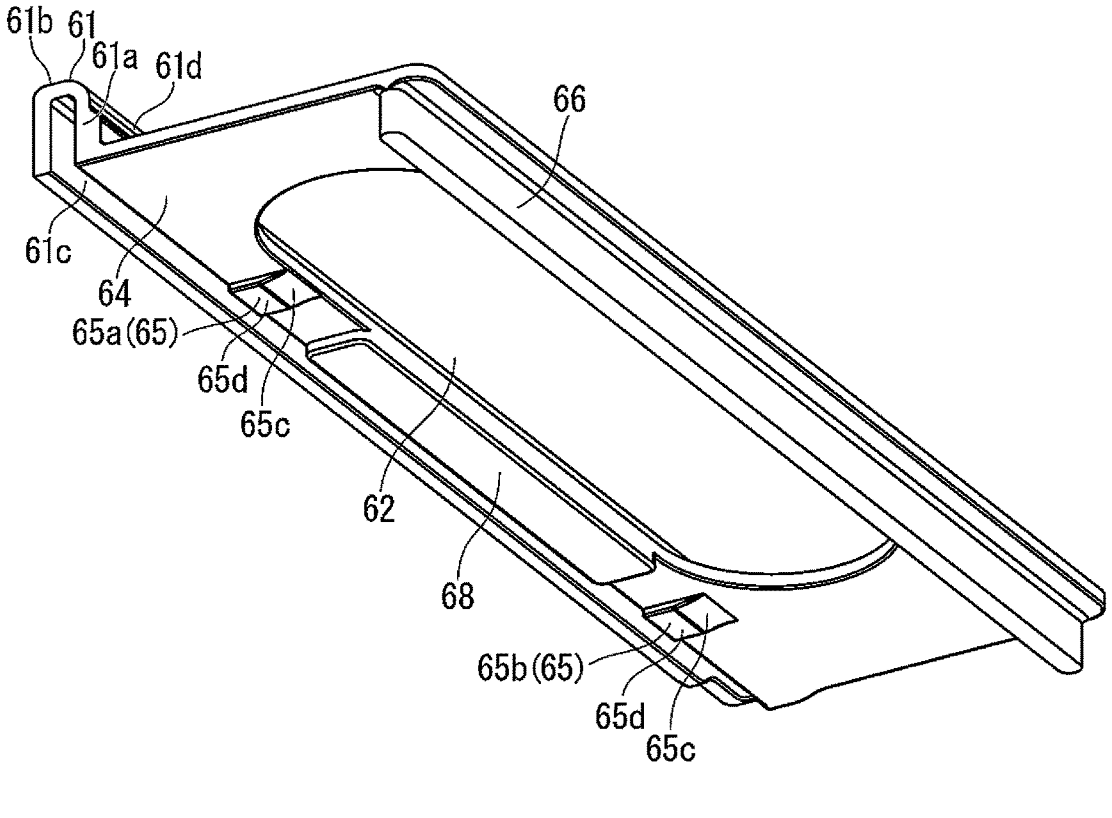
FIG. 6 is a perspective view showing the annular packing from a back surface side.

FIG. 5 is a perspective view showing the annular packing 60 from a front surface side. FIG. 6 is a perspective view showing the annular packing 60 from a back surface side.

The annular packing 60 particularly is a molded body made of resin (rubber or the like). The annular packing 60 is formed with at least one insertion hole 62.

In this embodiment, the plurality of (e.g. aforementioned three) juxtaposed female terminals 40 at least partly are inserted or insertable through the insertion hole 62.

Specifically, the insertion hole 62 substantially has a long hole shape in the parallel or arrangement direction of the female terminals 40.

Further, the peripheral wall portion 58 surrounding the one or more (e.g. aforementioned three) female terminals 40 at least partly is inserted through the insertion hole 62. In this embodiment, the insertion hole 62 particularly substantially is shaped along the outer periphery of the aforementioned peripheral wall portion 58.

Further, the annular packing 60 particularly includes a (particularly substantially flat) plate portion 63 around the insertion hole 62.

By inserting the one or more female terminals 40 through the inside of the insertion hole 62, the male terminals 20 and the female terminals 40 are properly connected.

The annular packing 60 is to be sandwiched or squeezed or engaged substantially in the connection direction A by the at least one male housing 30 and the female housing 50.

Specifically, as shown in FIG. 2, the (particularly substantially flat) plate portion 63 of the annular packing 60 is sandwiched or squeezed or engaged by (particularly a distal or lower end part 34 of) the male housing shell 30*b* and (particularly a distal or upper) end part 54 of the female housing shell 50*b*.

At this time, the wall portion 52 of the female housing 50 particularly at least partly is covered by a wall portion cover 61 of the annular packing 60.

The annular packing 60 particularly includes the wall portion cover 61. The wall portion cover 61 particularly includes the rising portion 61*a*, a wall portion tip cover 61*b* and^/or a wall portion outer cover 61*c*.

The wall portion tip cover 61*b* particularly substantially extends from the rising portion 61*a* and/or substantially covers a tip 52*b* of the wall portion 52.

Further, the wall portion outer cover 61*c* particularly further extends from the wall portion tip cover 61*b* and/or substantially covers an outer side surface 52*c* of the wall portion 52.

Note that, in this embodiment, the rising portion 61*a* particularly substantially covers an inner side surface 52*a* of the wall portion 52.

In this embodiment, the rising portion 61*a* particularly is formed with at least one dent 61*d*. The dent 61*d* particularly substantially guides the projection 33 of the male housing 30 to be described later when the annular packing 60 and the male housing 30 are combined.

Further, the dent 61*d* particularly is to be engaged with the projection 33.

When the annular packing 60 and the male housing 30 are combined, the projection 33 particularly substantially is guided by the dent 61*d* and, thereafter, the dent 61*d* substantially is deformed along the shape of the projection 33 by being pressed by the projection 33.

In this way, the dent 61*d* and the projection 33 particularly are engaged.

Further, although the annular packing 60 provided with the wall portion cover 61 for substantially covering the inner side surface 52*a*, the tip 52*b* and/or the outer side surface 52*c* of the wall portion 52 is adopted in this embodiment, there is no limitation to this. The rising portion 61*a* may cover only the inner side surface 52*a* without covering the tip 52*b* and the outer side surface 52*c* of the wall portion 52. In this case, the rising portion 61*a* is sandwiched in a direction intersecting the connection direction A (e.g. substantially perpendicular direction in this embodiment) between the male housing 30 and the wall portion 52.

Further, as shown in FIGS. 2, 5 and 6, the annular packing 60 particularly further includes at least one extending portion 66 extending along a side surface 59 of the female housing 50. In this embodiment, the extending portion 66 is provided at a position substantially facing the wall portion cover 61.

The extending portion 66 particularly substantially is provided along a longitudinal direction of the annular packing 60.

Further, the extending portion 66 particularly substantially extends downward along the side surface 59 of the female housing 50.

By including the extending portion 66, the inflow of liquid (e.g. water) into a gap between the female housing 50 and the annular packing 60, for example, from an outer lateral side particularly is reduced or suppressed.

Further, as shown in FIGS. 2 and 5, the annular packing 60 particularly further includes at least one protrusion 67 at least partly around or adjacent to the insertion hole 62. Specifically, the protrusion 67 is provided substantially along the extending portion 66 on the side of the extending portion 66.

By including the protrusion 67, the inflow of liquid (e.g. water) to a side inward of the protrusion 67 particularly is reduced or suppressed by the protrusion 67 even if liquid (e.g. water) flows into the gap between the male housing 30 and the annular packing 60, for example, from the outer lateral side.

Further, as shown in FIG. 6, one or more projecting portions 65 particularly are provided on a part to be sandwiched in the connection direction A by the male housing 30 and the female housing 50 (particularly on the (flat) plate portion 62 and/or a back side 64 of the (flat) plate portion 63).

Specifically, the one or more projecting portions 65 are formed at one or more positions inward of the rising portion 61*a* on the (flat) plate portion 63. In this embodiment, the projecting portions 65 particularly are formed on the back side 64 of the flat plate portion 63.

Further, the one or more projecting portions 65 particularly are formed at positions between the insertion hole 62 and the rising portion 61*a*.

The projecting portions 65 particularly include a first projecting portion 65*a* and a second projecting portion 65*b* located apart from each other in a longitudinal direction of the insertion hole 62.

Note that the one or more first and second projecting portions 65*a*, 65*b* are collectively called the projecting portions 65.

The one or more projecting portions 65 particularly are to be pressed and deformed by the male housing 30 and the female housing 50, whereby the gap between the male housing 30 and the annular packing 60 and/or the gap between the female housing 50 and the annular packing 60 can be reduced.

In this way, liquid (e.g. water) hardly intrudes between the first and second projecting portions 65*a*, 65*b* outside a part of the female housing 50 surrounding the female terminals 40.

Note that, in this embodiment, a joint part (recessed part 50*c* to be described later) between the female housing body 50*a* and the female housing shell 50*b* particularly is arranged between the first and second projecting portions 65*a*, 65*b*.

The inflow of liquid (e.g. water) to the joint part between the female housing body 50*a* and the female housing shell 50*b* particularly is reduced or suppressed by the first and second projecting portions 65*a*, 65*b*. Therefore, the liquid (water) stop effect by the annular packing 60 particularly is enhanced.

Specifically, the projecting portion 65 is thickest in a part closest to the rising portion 61*a*. In this embodiment, the projecting portion 65 particularly includes an inclined portion 65*c* extending toward the insertion hole 62. The inclined portion 65*c* particularly is inclined to be thinner from the side of the rising portion 61*a* toward the insertion hole 62.

In this embodiment, the projecting portion 65 particularly includes a substantially flat portion 65*d* on the side of the rising portion 61*a* and/or the (flat) portion 65*d* and/or the inclined portion 65*c* are connected.

Further, as shown in FIGS. 5 and 6, the annular packing 60 particularly further includes at least one bulging portion 68 between the two projecting portions 65.

The bulging portion 68 is, for example, embedded in the recessed part 50*c* (see FIGS. 3 and 4) formed in the female housing 50. Note that the recessed part 50*c* is the aforementioned joint part between the female housing body 50*a* and the female housing shell 50*b*.

By particularly including the bulging portion 68, the inflow of liquid (e.g. water) between the female housing body 50*a* and the female housing shell 50*b* is reduced or suppressed.

The bulging portion 68 particularly can be appropriately adapted to the shapes of the female housing 50 and/or the male housing 30, and the inflow of liquid (water) to the insides of the female housing 50 and the male housing 30 particularly is reduced or suppressed by adaptation to the shapes of the female housing 50 and/or the male housing 30.

(Relationship of Male Housing 30 and Annular Packing 60)

Figure 7:
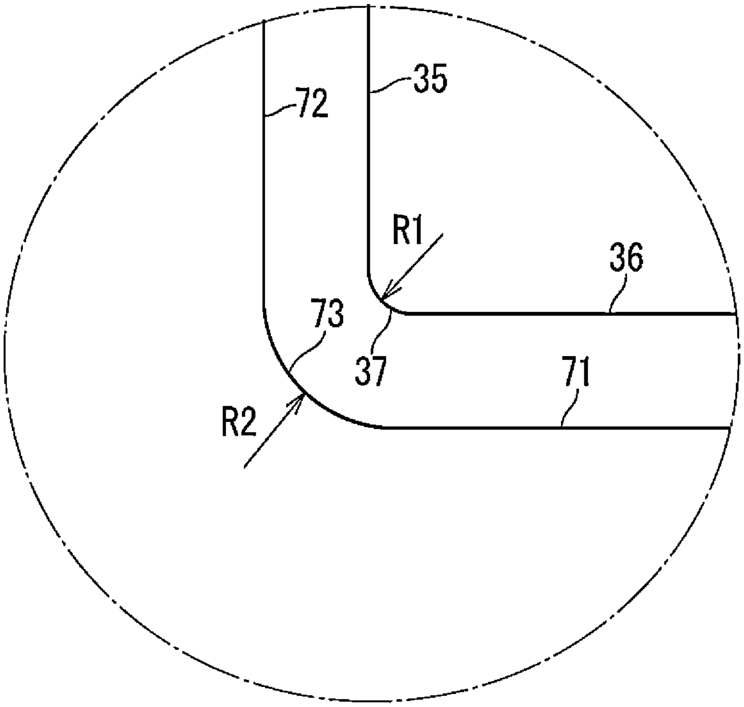
FIG. 7 is a partial enlarged view showing a state before a corner part of a male housing and a corner part of the annular packing come into contact.
Figure 8:
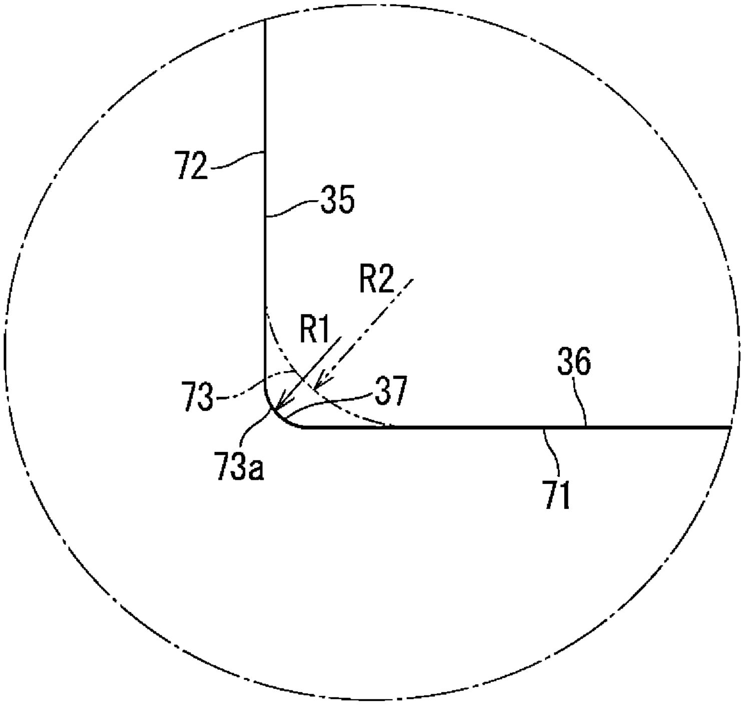
FIG. 8 is a partial enlarged view showing a state where the corner part of the male housing and the corner part of the annular packing are in contact.

FIG. 7 is a partial enlarged view showing a state before a corner part 37 of the male housing 30 and a corner part 73 of the annular packing 60 come into contact. FIG. 8 is a partial enlarged view showing a state where the corner part 37 of the male housing 30 and the corner part 73 of the annular packing 60 are in contact. Note that the part shown in FIGS. 7 and 8 corresponds to a part B of FIG. 2.

The corner part 37 between a side surface 35 and a surface 36 of the male housing 30 particularly has a rounded shape.

Further, the corner part 73 between a surface 71 of the annular packing 60 and a surface 72 of the rising portion 61*a* particularly has a rounded shape.

Specifically, a radius of curvature R1 of the corner part 37 is smaller than a radius of curvature R2 of the corner part 73. Note that the side surface 35 is a surface facing the wall portion 52 of the female housing 50 in the male housing 30.

Further specifically, the surface 36 is a surface for sandwiching the annular packing 60 substantially in the connection direction A together with the female housing 50.

Further specifically, the surface 71 is a surface to be sandwiched between the female housing 50 and the male housing 30 and/or brought into contact with the male housing 30 in the annular packing 60.

Further specifically, the surface 72 is a surface to be brought into contact with the male housing 30 in the rising portion 61*a*.

The radius of curvature R1 of the corner part 37 particularly is smaller than the radius of curvature R2 of the corner part 73. Thus, the corner part 73 is pressed and deformed when the corner part 37 contacts the corner part 73 as shown in FIG. 7. At this time, the corner part 73 (shown by a dashed-dotted line) particularly substantially is deformed into the shape of a corner part 73*a* along the shape of the corner part 37 as shown in FIG. 8. That is, the corner part 73 particularly is so deformed that the radius of curvature R2 of the corner part 73 approximates to the radius of curvature R1. In this way, a gap between the corner parts 37, 73 is reduced.

(2. Effects, Etc.)

The connector system 100 configured as described above is provided with the one or more female terminals 40, the female housing 50 for at least partly accommodating the one or more female terminals 40, one or more the male terminals 20 to be connected to the one or more respective female terminals 40, the at least one male housing 30 for at least partly accommodating the one or more male terminals 20 and/or particularly entirely surrounding around the female terminals 40 and the male terminals 20 in cooperation with the female housing 50, and/or the at least one annular packing 60 to be sandwiched or squeezed or compressed by the female housing 50 and the male housing(s) 30 substantially in the connection direction A of the female terminal(s) 40 and the male terminal(s) 20.

The female housing 50 particularly includes the at least one wall portion 52 particularly substantially extending in the connection direction A of the female terminal(s) 40 and the male terminal(s) 20 outside the male housing 30.

The annular packing 60 particularly includes the rising portion 61*a* to be sandwiched or squeezed or compressed by the male housing(s) 30 and the wall portion 52 in the direction intersecting the connection direction A. In this way, the annular packing 60 particularly is sandwiched in both the connection direction A and the direction intersecting the connection direction A between the female housing 50 and the male housing(s) 30.

By sandwiching the annular packing 60 in the connection direction A, fluid or liquid (e.g. water) is stopped between the female housing 50 and the male housing 30.

By sandwiching the annular packing 60 in the direction intersecting the connection direction A, the intrusion of fluid or liquid (e.g. water) from the laterally outer side to the inside of the connector system 100 is stopped.

The annular packing 60 particularly further includes the wall portion tip cover 61*b* particularly substantially extending from the rising portion 61*a* to at least partly cover the tip 52*b* of the wall portion 52 and/or the wall portion outer cover 61*c* particularly further extending from the wall portion tip cover 61*a* to at least partly cover the outer side surface 52*c* of the wall portion 52.

In this way, an effect of stopping liquid (e.g. water) to the insides of the female housing 50 and the male housing 30 from outside and above the wall portion 52 particularly is enhanced. Therefore, liquid (e.g. water) splash on the female terminals 40 and the male terminals 20 particularly is reduced or suppressed.

Further, the male housing 30 particularly includes the one or more projection 33 substantially projecting toward the wall portion 52. In this way, a pressing force particularly is enhanced between a part of the annular packing 60 where the projection 33 is present and the wall portion 52. Thus, the liquid (e.g. water) stop effect is particularly enhanced in the part of the annular packing 60 where the projection 33 is present.

Further, when the annular packing 60 and the male housing 30 are combined, the projection 33 particularly substantially is guided into the dent 61*d* of the annular packing 60. In this way, the projection 33 and the annular packing 60 can be smoothly engaged.

Further, the annular packing 60 particularly includes the one or more projecting portions 65 at the one or more positions on the side of the rising portion 61*a* in the part to be sandwiched or squeezed or compressed in the connection direction A by the female housing 50 and the male housing 30.

The projecting portions 65 particularly are located closer to the female terminal(s) 40 (male terminal(s) 20) than the rising portion 61*a*. In this way, the projecting portions 65 are pressed and deformed by the female housing 50 and the male housing 30. In this way, the gap between the female housing 50 and the annular packing 60 and/or the gap between the male housing 30 and the annular packing 60 are reduced.

Particularly, a gap between a corner part 57 (see FIG. 2) formed by a horizontal part of the female housing 50 and the inner side surface 52*a* of the wall portion 52 and the annular packing 60 particularly is reduced. In this way, the liquid (e.g. water) stop effect from the outside to the inside of the connector system 100 is enhanced.

Further, the projecting portions 65 particularly are thickest in the parts closest to the rising portion 61*a*. In this way, the projecting portions 65 particularly are pressed and deformed by the female housing 50 and the male housing 30 when the annular packing 60 is sandwiched or squeezed or compressed between the female housing 50 and the male housing 30.

At this time, since the parts closest to the rising portion 61*a* particularly are formed thickest, the annular packing 60 deformed by pressing the corner part 57 formed by the horizontal part of the female housing 50 and the inner side surface 52*a* of the wall portion 52 more easily enters the gap of the corner part 57.

In this way, the gap between the corner part 57 formed by the horizontal part of the female housing 50 and the inner side surface 52*a* of the wall portion 52 and the annular packing 60 particularly is further reduced.

Further, the annular packing 60 particularly includes the insertion hole 62 particularly substantially in the form of a long hole, through which the part (peripheral wall portion 58) of the female housing 50 surrounding the one or more female terminals 40 at least partly is inserted or insertable. The projecting portions 65 particularly include the first and/or second projecting portions 65*a*, 65*b* located apart from each other in the longitudinal direction of the insertion hole 62 between the rising portion 61*a* and the insertion hole 62.

In this way, liquid (e.g. water) hardly intrudes between the first and second projecting portions 65*a*, 65*b* outside the part (peripheral wall portion 58) of the female housing 50 at least partly surrounding the female terminals 40.

Note that even if the joint part between the female housing body 50*a* and the female housing shell 50*b* is arranged between the first and second projecting portions 65*a*, 65*b*, the inflow of liquid (e.g. water) to the joint part between the female housing body 50*a* and the female housing shell 50*b* particularly is reduced or suppressed by the first and/or second projecting portions 65*a*, 65*b*. Therefore, the liquid (water) stop effect by the annular packing 60 is enhanced.

Further specifically, the corner part 37 between the side surface 35 facing the wall portion 52 in the male housing 30 and the surface 36 for sandwiching the annular packing 60 in the connection direction A together with the female housing 50 particularly has a rounded shape having the radius of curvature R1.

Further specifically, the corner part 73 between the surface 71 to be sandwiched between the female housing 50 and the male housing 30 and brought into contact with the male housing 30 in the annular packing 60 and the surface 72 to be brought into contact with the male housing 30 in the rising portion 61*a* particularly has a rounded shape having the radius of curvature R2.

Particularly, the radius of curvature R1 is smaller than the radius of curvature R2. In this way, the corner part 73 of the annular packing 60 is pressed by the corner part 37 of the male housing 30.

Since the radius of curvature R1 of the corner part 37 particularly is smaller than the radius of curvature R2 of the corner part 73, the corner part 73 of the annular packing 60 is easily deformed. Further specifically, the gap between the male housing 30 and the annular packing 60 can be reduced.

[Miscellaneous]

In the connector system 100 according to the above embodiment, the arrangement of the one or more female terminals 40 and the female housing 50, and the one or more male terminals 20 and the male housing 30 may be reversed. In this case, a peripheral wall portion of a male housing may be formed around the one or more male terminals 20 and an outer peripheral wall portion of a female housing may be formed around the peripheral wall portion of the male housing. In such a case, an annular packing may be arranged around the peripheral wall portion of the male housing.

It should be understood that the female housing 50 may be connected to plural male housings 30 and may have plural wall portions 52 particularly substantially extending in a connection direction A of the one or more respective male terminals 20 of the plural male housings 30 and the one or more female terminals 40 particularly outside the outer peripheral wall portion 38 of the respective male housing 30. In such case, one single packing 60 particularly may be arranged between female housing 50 and the plural male housings 30.

The connector system 100 according to the above embodiment particularly may be used to connect devices installed in a vehicle or may be used to connect various other devices.

Note that the respective configurations described in the above embodiment and modifications can be combined as appropriate without contradicting each other.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector system, comprising:
at least one terminal;
a housing for at least partly accommodating the terminal,
at least one mating terminal to be connected to the terminal;
at least one mating housing for at least partly accommodating the mating terminal, the mating housing entirely surrounding around the terminal and the mating terminal in cooperation with the housing; and
at least one annular packing to be sandwiched by the housing and the mating housing in a connection direction of the terminal and the mating terminal,
wherein:
the housing includes at least one wall portion substantially extending in the connection direction of the terminal and the mating terminal outside the mating housing,
the annular packing includes at least one rising portion to be sandwiched by the mating housing, the wall portion in a direction intersecting the connection direction, a wall portion tip cover extending from the rising portion to at least partly cover a tip of the wall portion; and preferably a wall portion outer cover further extending from the wall portion tip cover to at least partly cover an outer side surface of the wall portion.

2. The connector system according to claim 1, wherein the mating housing includes at least one projection projecting toward the wall portion.

3. The connector system according to claim 1, wherein the annular packing includes at least one projecting portion to be sandwiched substantially in the connection direction by the housing and the mating housing, the projecting portion preferably being located on the rising portion side.

4. The connector system according to claim 3, wherein the projecting portion is thickest in a part closest to the rising portion.

5. The connector system according to claim 3, wherein:
the annular packing includes an insertion hole substantially in the form of a long hole, a part of the housing surrounding the terminal being inserted through the insertion hole, and
the projecting portions include a first projecting portion and a second projecting portion located apart from each other in a longitudinal direction of the insertion hole between the rising portion and the insertion hole.

6. The connector system according to claim 1, wherein:
a corner part between a side surface substantially facing the wall portion, out of the mating housing, and a surface for pressing the annular packing toward the housing along the connection direction, out of the mating housing, substantially has a rounded shape having a radius of curvature R1,
a corner part between a surface to be brought into contact with the mating housing in a part to be sandwiched between the housing and the mating housing, out of the annular packing, and a surface to be brought into contact with the mating housing in the rising portion substantially has a rounded shape having a radius of curvature R2, and
the radius of curvature R1 is smaller than the radius of curvature R2.

7. A method of assembling a connector system, comprising:
at least partly accommodating at least one terminal in a housing;
at least partly accommodating at least one mating terminal to be connected to the terminal into at least one mating housing; and
mating the at least one mating housing with the housing thereby
entirely surrounding the mating housing around the terminal and the mating terminal in cooperation with the housing; and
sandwiching at least one annular packing by the housing and the mating housing in a connection direction of the terminal and the mating terminal,
wherein:
the housing includes at least one wall portion substantially extending in the connection direction of the terminal and the mating terminal
outside the mating housing,
the annular packing includes at least one rising portion to be sandwiched by the mating housing, the wall portion in a direction intersecting the connection direction, a wall portion tip cover extending from the rising portion to at least partly cover a tip of the wall portion; and preferably a wall portion outer cover further extending from the wall portion tip cover to at least partly cover an outer side surface of the wall portion.

8. The method according to claim 7, further comprising sandwiching at least one projecting portion of the annular packing substantially in the connection direction by the housing and the mating housing, the projecting portion preferably being located on the rising portion side.

9. The method according to claim 8, wherein:
the annular packing includes an insertion hole substantially in the form of a long hole, a part of the housing surrounding the terminal being inserted through the insertion hole, and
the projecting portions include a first projecting portion and a second projecting portion located apart from each other in a longitudinal direction of the insertion hole between a rising portion of the annular packing and the insertion hole.

* * * * *